Dec. 28, 1965          C. S. KELLEY ETAL          3,225,550
FRACTIONAL DISTILLATION CONTROL SYSTEM
Filed March 4, 1963
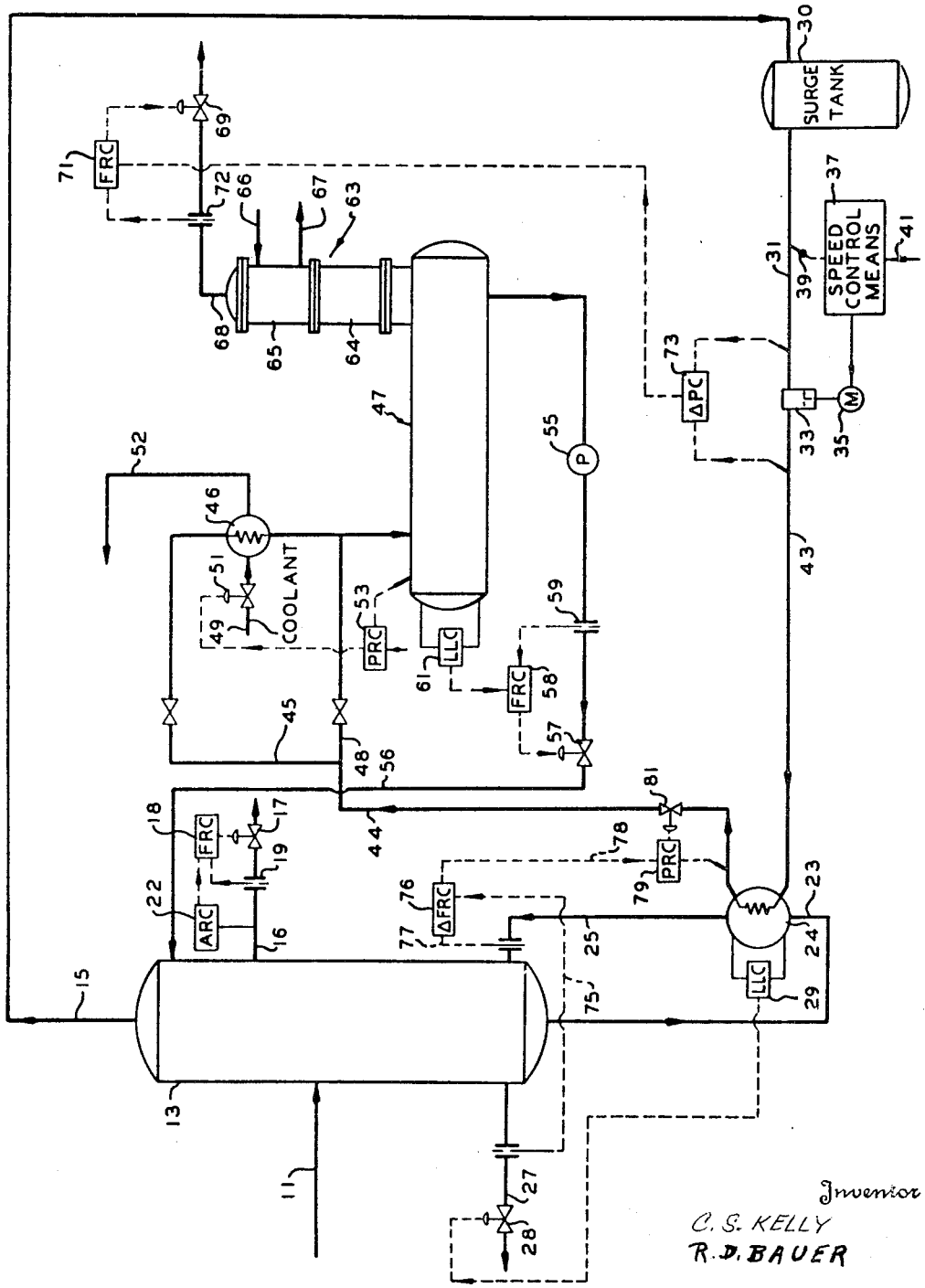
Inventor
C. S. KELLY
R. D. BAUER
By
Young & Quigg
Attorney United States Patent Office 3,225,550
Patented Dec. 28, 1965

3,225,550
FRACTIONAL DISTILLATION CONTROL SYSTEM
Carl S. Kelley and Robert D. Bauer, Bartlesville, Okla., assignors to Phillips Petroleum Company, a corporation of Delaware
Filed Mar. 4, 1963, Ser. No. 262,730
7 Claims. (Cl. 62—21)

This invention relates to a control system for a fractionation distillation process. In one aspect the invention relates to the upgrading of a desired component-rich stream to a still purer product in a heat pump or vapor recompression type distillation operation. In another aspect the invention relates to the upgrading of a mixture of hydrocarbons with respect to a component of the mixture which is present in the feed in a very high concentration and involving a heat pump operation to provide heat for the distillation column. In a specific embodiment the invention relates to the concentration by distillation of a propylene-rich feed stock containing hydrocarbons of $C_4$ and less in a heat pump type of operation.

In accordance with the invention there is provided a novel control system for stabilizing the operation of a fractional distillation column wherein an overhead vaporous stream is withdrawn from the column and compressed to provide a heated compressed stream, the heated compressed stream is passed in indirect heat exchanging relationship in a reboiler with kettle material from the column to vaporize the kettle material and thereby produce a stream of vaporized kettle material which is returned to the column, and a vaporous bottoms product stream is withdrawn from the lower portion of the column. In accordance with the invention the flow rate of the vaporous bottom product is controlled responsive to the level of liquid kettle material in the reboiler, and the difference between the flow rates of the vaporized kettle material and the vaporous bottoms product stream is determined and utilized to control the pressure of the heated compressed stream thereby regulating the heat transfer between the heated compressed stream and the kettle material and thus the input to the distillation operation.

Accordingly, it is an object of the invention to provide improved method and means for regulating a fractional distillation operation. Another object of the invention is to provide method and apparatus for regulating the heat input to a fractional distillation column. A still further object of the invention is to provide a fractional distillation system having improved stability.

Other aspects, objects, and advantages of the invention will become apparent from a study of the disclosure, the drawing, and the appended claims to the invention.

Referring now to the drawing there is shown a schematic representation of a fractional distillation system for the upgrading of the content of a component of a feed stock boiling intermediate the boiling points of the lowest boiling and highest boiling components of the feed stock wherein the lowest boiling component is present in the feed stock in too low a concentration, for example on the order of three percent by weight or less of the total feed stock, to serve as a means for controlling the pressure in the fractional distillation column. While the invention is applicable to the fractional distillation of any mixture, the invention will be described in terms of a separation of a feed stock comprising ethane, propylene, and propane as the lowest boiling component, intermediate boiling component, and highest boiling component, respectively. A feed stream of ethane, propylene, and propane is passed through conduit 11 into a fractional distillation column 13 and fractionally distilled therein. An overhead vapor stream containing a portion of the ethane is withdrawn from fractional distillation column 13 by way of conduit 15, while a product stream enriched in propylene can be withdrawn by way of side draw conduit 16. The rate of withdrawal of product by way of conduit 16 can be controlled by any suitable means. For example, the rate of flow through conduit 16 can be controlled by a vave 17 which is manipulated by a flow recorder controller 18 responsive to a comparison of a set point value and the differential pressure across an orifice 19 located in conduit 16. The rate of withdrawal of product through conduit 16 can be controlled by valve 17 responsive to the output of an analyzer controller 22. If desired the set point value of flow recorder controller 18 can be manipulated by analyzer recorder 22, responsive to the composition of the product in conduit 16.

A liquid stream is withdrawn from the bottom of fractional distillation column 13 by way of conduit 23 and introduced into reboiler 24 wherein the withdrawn liquid is subjected to indirect heat exchange to effect the vaporization of the liquid. The vapors thus produced are withdrawn from reboiler 24 and passed by way of conduit 25 into the lower portion of column 13, preferably below the lowest tray. A vapor stream containing substantially all of the propane and only a small portion of the propylene is withdrawn from the bottom section of column 13 by way of conduit 27 and is passed to a point of utilization, recovery, or further treatment. The rate of flow through conduit 27 can be controlled by valve 28 which can be manipulated by liquid level controller 29 responsive to the level of liquid kettle material in reboiler 24 to maintain such level substantially constant. In one particular embodiment the vapor stream withdrawn by way of conduit 27 is utilized as a fuel gas.

The overhead vapor stream in conduit 15 is introduced into a surge tank 30 from which a vapor stream is withdrawn by way of conduit 31 and subjected to compression in a compressor 33, which is driven by a suitable means such as motor 35. The speed of motor 35, and thus the rate of compression, is controlled by a speed control means 37 responsive to a comparison of the pressure in conduit 31, as indicated by a pressure sensing means 39, and a value applied to set point input 41. The resulting hot vaporous compressed stream is passed by way of conduit 43 into reboiler 24 in indirect heat exchange with the kettle contents contained therein. The cooled fluid stream is withdrawn by way of conduit 44 and passed by way of conduit 45 through heat exchanger 46 into accumulator 47. If desired, a portion of the cooled fluid stream can be withdrawn from conduit 44 and bypassed around heat exchanger 46 by way of conduit 48. A suitable coolant is passed by way of conduit 49 and valve 51 into heat exchanger 46 with the warmed coolant being withdrawn by way of conduit 52. Valve 51 can be controlled by pressure recorder controller 53 responsive to the pressure in accumulator 47 to maintain such pressure substantially constant by varying the rate of flow of coolant through heat exchanger 46. If desired, the ratio of the rates of flow in conduits 45 and 48 can be regulated responsive to the pressure in accumulator 47 to maintain the pressure substantially constant instead of or in addition to the regulation of the rate of flow of coolant through conduit 49. The hot vaporous stream from conduit 43 is partially condensed by its passage through reboiler 24 and heat exchanger 46 to produce a condensate and an uncondensed gas enriched in ethane. The condensate is withdrawn from accumulator 47 and is passed by way of pump 55 and conduit 46 into an upper portion of column 13 as reflux therefor. The rate of flow of reflux through conduit 46 is controlled by valve 57 which is manipulated by flow rate recorder controller 58 responsive to a comparison of the differential pressure across an orifice 59 in conduit 56 and the set point value on controller 58. The set point value to controller 58 is in turn manipulated by liquid level controller 61, which is mounted on accumulator 47, to maintain the liquid level in accumulator 47 substantially constant.

A self-refluxing gas absorber 63 is connected to the vapor section of accumulator 47 and comprises a contactor section 64 and a refrigeration section 65. A vapor stream is withdrawn from accumulator 47 and passed into contactor section 64 wherein the ascending vapor is contacted with descending liquid resulting from a condensation of a portion of the ascending vapor in refrigeration section 65. A suitable refrigerant is passed by way of conduit 66 into indirect heat exchange relationship with refrigeration section 65 and is withdrawn therefrom by way of conduit 67. The remaining uncondensed gas is withdrawn from absorber 63 and passed by way of conduit 68 and valve 69 to vent, recovery, or further treatment. Valve 69 is manipulated by a flow recorder controller 71 responsive to a comparison of the differential pressure across an orifice 72 in conduit 68 and a set point value. The set point value to flow recorder controller 71 is manipulated by a differential pressure recorder controller 73 responsive to the difference in pressure of the overhead vapor stream in conduit 31 and the hot vaporous compressed stream in conduit 43. Thus for an increase in the overhead pressure in column 13 speed control means 37 causes motor 35 to speed up and increase the rate of compression in compressor 33 in order to return the pressure in conduit 31 to its normal operating value. This increase in the rate of compression is accompanied by an increase in the differential pressure across compressor 33, that is, an increase in the difference in the pressure between the overhead vapor stream in conduit 31 and the hot vaporous compressed stream in conduit 43. This increase in pressure differential is utilized to reset flow recorder controller 71 to permit an increase in the rate of withdrawal of off-gas by way of conduit 68. Similarly upon a decrease in the overhead pressure in column 13 the speed of the motor 35 is reduced by control means 37, causing a reduction in the rate of compression in compressor 33. This reduction in the rate of compression is accompanied by a decrease in differential pressure across compressor 33, and this decrease in pressure differential is utilized to reset flow recorder controller 71 to reduce the rate of withdrawal of off-gas by way of conduit 68. Accordingly, it is readily seen that this control system provides for maintaining the overhead pressure of the fractional distillation column substantially constant at the desired value while regulating the rate of flow of off-gas without incurring an excessive loss of propylene through conduit 68. This control system reduces the comsumption of power by the compressor to a minimum, decreases possibility of off-specification product, and relieves the operator from having to continuously watch and reset controls.

In accordance with the invention a first signal representative of the rate of flow of fluid through conduit 27 is transmitted by way of line 75 to a first input of differential flow rate recorder controller 76. A second signal representative of the rate of flow of fluid through conduit 25 is transmitted by way of line 77 to a second input of controller 76. Controller 76 produces an output signal responsive to the difference between the first and second signals. The output signal is transmitted by way of line 78 to the reset input of pressure recorder controller 79. A valve 81 in conduit 44 is manipulated by pressure recorder controller 79 responsive to a comparison of the actual pressure in conduit 44 and the output signal of controller 76. Valve 81 thus controls the amount of heat which is transferred from the hot vaporous compressed stream of conduit 43 into the kettle material in reboiler 24, and thereby the heat input to column 13. For example, if too much liquid is produced in the bottom of column 13, the liquid level of kettle material in reboiler 24 will tend to rise. Liquid level controller 29 will actuate valve 28 to increase the rate of withdrawal of vapor through conduit 27. This results in a decrease in the difference between the flow rates in conduits 25 and 27, and differential flow rate controller 76 accordingly resets the set point value on pressure controller 79 to actuate valve 81 to raise the pressure upstream of valve 81. This increase in pressure of the compressed vapors passing from conduit 43 into reboiler 24 raises the condensation pressure and hence the condensation temperature of the compressed vapors. This permits additional heat to be transferred from the compressed vapors to the kettle material in reboiler 24 due to the higher differential temperature. The increase in heat transferred results in an increase in flow rate through conduit 25 until the system returns to desired operating conditions. A reverse action, that is, a drop in the liquid level in reboiler 24, will cause the reverse effect. Consequently the control system regulates the heat input to the column and thereby stabilizes operation of the column.

The following example is presented in further illustration of the invention and should not be construed unduly in limitation thereof. In the operation of a particular fractional distillation system in accordance with the invention for the separation of a feedstock comprising ethane, propane, and propylene under the conditions set forth in Table I the process streams have the compositions set forth in Table II.

*Table I*

|  | Pressure, p.s.i.g. | Temperature, °F. |
|---|---|---|
| Feed Stock | 110 | 45 |
| Column 13: |  |  |
| Kettle | 91 | 55 |
| Overhead | 83 | 38 |
| Surge Tank 30 | 80 | 38 |
| Compressor 33: |  |  |
| Suction | 80 | 38 |
| Discharge | >135 | >95 |
| Conduit 44 | 132 | 68 |
| Accumulator 47 | 130 | 64 |
| Conduit 68 | 129 | 15 |
| Conduit 16 | 85 | 45 |
| Conduit 23 | 91 | 55 |
| Conduit 25 | 91.5 | 57 |
| Conduit 27 | 91 | 55 |

*Table II*

| Component/Stream | 11 Lbs./hr. | 16 Lbs./hr. | 27 Lbs./hr. | 68 Lbs./hr. |
|---|---|---|---|---|
| Ethane | 150 | 5 |  | 145 |
| Propylene | 17,000 | 16,155 | 700 | 145 |
| Propane | 9,850 | 80 | 9,770 |  |
| Total | 27,000 | 16,240 | 10,470 | 290 |

The effects of a slight increase in $C_2$ content of feed streams is illustrated in Table III.

*Table III*

| Component/Stream | 11 Lbs./hr. | 16 Lbs./hr. | 27 Lbs./hr. | 68 Lbs./hr. |
|---|---|---|---|---|
| Ethane | 250 | 8 |  | 242 |
| Propylene | 17,000 | 16,062 | 700 | 238 |
| Propane | 9,750 | 80 | 9,670 |  |
| Total | 27,000 | 16,150 | 10,370 | 480 |

The slight increase in $C_2$ content illustrated in Table III required that almost twice as much off-gas be vented. The control system of the invention maintains the loss of propylene through conduit 68 at a minimum while maintaining the power consumption of compressor 33 at a minimum.

We claim:

1. A process for the distillation of a multicomponent feed stock in a heat pump operation comprising introducing said feed stock into a fractional distillation zone and fractionally distilling said feed stock therein, withdrawing an overhead vaporous stream from said zone, compressing said stream wherein the compressed stream becomes heated, withdrawing liquid kettle material from said fractional distillation zone, indirectly heating the thus withdrawn kettle material with the heated compressed stream in a first indirect heat exchange zone whereby the kettle material becomes vaporized and the compressed stream becomes cooled and partially condensed, returning the resulting condensate to the fractional distillation zone as reflux therefor, promoting vapor flow from the lower portion of said fractional distillation zone upwardly through said fractional distillation zone by introducing the vaporized kettle material into said lower portion of said fractional distillation zone, withdrawing vaporous bottoms product from said fractional distillation zone at a level below the level of introduction of said vaporized kettle material, separately sensing the vapor flows of said vaporized kettle material and of said vaporous bottoms product, and regulating the pressure of the compressed overhead vaporous stream responsive to the difference between the flow rates of said vaporized kettle material and said vaporous bottoms product, thereby regulating the heat input to the distillation operation.

2. A process in accordance with claim 1 comprising further cooling prior to return of said condensate to the fractional distillation zone the cooled and partially condensed compressed stream in a second indirect heat exchange zone with an extraneous coolant whereby the once cooled stream becomes further cooled with the production of further condensate, and returning the total condensate to the fractional distillation zone as reflux therefor.

3. A process in accordance with claim 1 wherein said feed stock comprises a propylene-rich stream containing minor proportions of ethane and propane, said vaporous bottoms product being a vaporous propane product, and the uncondensed portion of said compressed stream being rich in ethane, and further comprising withdrawing a sidestream enriched in propylene.

4. A process in accordance with claim 1 wherein the step of regulating comprises restricting the flow of the compressed overhead vaporous stream upon sensing an increase in the difference between the flow rates of said vaporized kettle material and said vaporous bottoms product, whereby the compressed overhead vaporous stream becomes further heated by increased compression thereby imparting further heating in the indirect heat exchange between said compressed overhead vaporous stream and said withdrawn kettle material.

5. A process in accordance with claim 1 further comprising regulating the rate of flow of said vaporous bottoms product responsive to the level of liquid kettle material in said first indirect heat exchange zone.

6. An apparatus comprising, in operable combination, a fractional distillation column having an overhead vaporous product outlet, a first liquid outlet in the bottom of the column, an outlet for vaporous bottoms product at an elevation above said first liquid outlet, an outlet for a liquid sidestream near the top of the column, a feed inlet, and an inlet for heated vapors at a level above but near the outlet for vaporous bottoms product, first means for sensing flow of vaporous product through the vaporous bottoms product outlet, an indirect heat exchanger, a first conduit communicating between the first liquid outlet in the bottom of the column and the inlet for heated vapors by way of said heat exchanger, second means for sensing vapor flow through said first conduit intermediate said heat exchanger and said inlet for heated vapors, said first and second means for sensing vapor flows being adapted to emit signals responsive to the respective vapor flows, control means communicating with said first and second means for sensing vapor flows and being adapted to emit a signal responsive to the difference in signals from said first and second means for sensing vapor flows, a compressor, a second conduit leading from the overhead vaporous product outlet of said column to the inlet of said compressor, said indirect heat exchanger having a coil therein, an accumulator, a third conduit including said coil communicating the outlet of said compressor with said accumulator, means for passing reflux from said accumulator to the top portion of said column, a pressure control means in said third conduit intermediate said heat exchanger and said accumulator, said pressure control means being adapted to control pressure in the stated portion of said third conduit in response to the emitted signal from said control means.

7. Apparatus in accordance with claim 6 further comprising means for controlling the rate of flow of vaporous product through said vaporous bottoms product outlet responsive to the level of liquid kettle material in said heat exchanger.

References Cited by the Examiner
UNITED STATES PATENTS

| | | | |
|---|---|---|---|
| 2,600,110 | 6/1952 | Hachmuth | 62—26 X |
| 2,645,104 | 7/1953 | Kniel | 62—26 X |
| 2,729,954 | 1/1956 | Etienne | 62—28 |
| 2,732,414 | 1/1956 | Stoops | 62—26 X |
| 2,743,590 | 5/1956 | Grunberg | 62—28 |

NORMAN YUDKOFF, *Primary Examiner.*